Patented Oct. 17, 1933

1,931,367

UNITED STATES PATENT OFFICE 1,931,367

NONCORROSIVE INSECTICIDAL COMPOSITIONS

Earl B. Alvord, Cleveland Heights, Ohio, assignor to The Grasselli Chemical Company, Cleveland, Ohio, a corporation of Delaware No Drawing. Application August 24, 1932
Serial No. 630,319

8 Claims. (Cl. 167—14)

The present invention relates to insecticidal compositions, which comprise barium fluosilicate as the active parasiticidal ingredient, which compositions have in aqueous suspension a pH greater than about 4.0.

Barium fluosilicate has of late years become of great prominence as an insecticide.

In the practical application of this new insecticide as a spray in aqueous suspension, a serious difficulty has been met in that such aqueous suspensions of barium fluosilicate were strongly corrosive, particularly toward certain types of spray pumps commonly used by large orchardists. Such pumps are constructed with cylinders of white enamel lined steel or cast iron and use rubber pistons. While such construction prevents rusting of the equipment while idle, it was found that the enamel is rapidly destroyed when the pumps are used with barium fluosilicate sprays.

I have found that the acidity of the barium fluosilicate sprays was responsible for the attack of the spraying equipment and I further found that a pH value of about 4.0 is the critical point below which there is substantial attack of the enamel, whereas sprays having a pH above 4.0 are practically inert towards the enamel lining of the spraying equipment in common use.

I have found in this investigation that practically every sample of even the purest barium fluosilicate as manufactured by all processes known to me, when mixed with water to make a slurry or suspension of spray strength imparts to the suspension a pH value of approximately 3.7 or less, which is in the range of corrosive acidity. Addition of alkali to such sprays to neutralize this acidity is not possible as barium fluosilicate decomposes in the presence of alkali.

I have, however, found that the addition of relatively small amounts of a somewhat water soluble, ionizable and substantially neutral fluoride to barium fluosilicate suspensions raises the pH value of such suspensions above the critical limit for corrosiveness.

In the practice of producing a non-corrosive barium fluosilicate insecticide according to my invention, I mix with the barium fluosilicate or add to its aqueous suspension from about 5 to 10 or more per cent of a slightly water soluble, substantially neutral fluoride, such as sodium fluoride, barium fluoride, sodium-aluminum fluoride (otherwise called cryolite), etc. The solubility of these fluorides is given in the literature as follows, expressed in grams of the fluoride per 100 cc of solution at 25° C:NaF:4.05; $BaF_2$:0.121; $Na_3AlF_6$:0.061. The fluoride used in my novel composition must be noticeably soluble in water to produce the desired effect, such solubility must at least be greater than that of for instance calcium fluoride which is 0.004 grams per 100 cc of solution at 25° C.

The following pH values have been obtained in aqueous suspensions corresponding to three pounds of the insecticide suspended in one hundred gallons of water, which is a common concentration for agricultural sprays.

| Insecticide | | pH |
|---|---|---|
| $BaSiF_6$ | 100% | 3.7–3.8 |
| $BaSiF_6$<br>$BaF_2$ | 95%<br>5% | 4.0 |
| $BaSiF_6$<br>$BaF_2$ | 90%<br>10% | 4.0–4.2 |
| $BaSiF_6$<br>$BaF_2$ | 80%<br>20% | 4.2–4.4 |
| $BaF_2$ | 100% | 7.6–8.0 |
| NaF | 100% | 8.2–8.4 |
| $BaSiF_6$<br>NaF | 95%<br>5% | 4.2 |
| $BaSiF_6$<br>NaF | 90%<br>10% | 4.4 |
| $BaSiF_6$<br>NaF | 80%<br>20% | 4.8 |
| $Na_3AlF_6$ | 100% | 7.2–7.6 |
| $BaSiF_6$<br>$Na_3AlF_6$ | 90%<br>10% | 4.2 |
| $BaSiF_6$<br>$Na_3AlF_6$ | 80%<br>20% | 4.4 |

The pH of the water used in these tests was 7.4.

It was found that in some mixtures the pH slightly increased during a period of several hours as indicated in the above table where, in several instances, a pH range is indicated. In the case of suspensions of barium fluosilicate and cryolite the pH of freshly prepared mixtures was considerably higher and the figures indicated for such suspensions represent the value obtained after about an hour's standing of the suspension from which time on the value remained substantially constant.

A theoretical explanation of the phenomena disclosed by the results of the above tests may be as follows:

Barium fluosilicate decomposes to a slight extent in aqueous solutions into $BaF_2$ and $SiF_4$. This latter hydrolyzes then into $SiO_2$ and 4HF and this latter imparts to the aqueous solution the acidity indicated by the pH of 3.7 or 3.8 found for aqueous suspensions of the purest barium fluosilicate available. An aqueous solution of barium fluosilicate may therefor contain an equilibrium represented by the formula:

$$BaSiF_6 \rightleftharpoons BaF_2 + SiF_4 \rightleftharpoons SiO_2 + 4HF$$

When I add to such a system in equilibrium other fluorine ions the decomposition of the barium fluosilicate and/or the hydrolysis of the $SiF_4$ is to a certain extent suppressed according to the mass action law and less free HF will be found in the system, as is indicated by the increased pH thereof. The concentration of the aqueous suspension is practically immaterial within the range of compositions used in agricultural sprays, as in each instance I obtain saturated solutions in the presence of the large excess of undissolved material.

A possible experimental confirmation of the above explanation can be found in my experiments in which I add barium carbonate to an aqueous suspension of barium fluosilicate. Barium carbonate imparts to its aqueous suspensions a pH of 8.0, similar to that of sodium fluoride or barium fluoride and for purposes of this invention barium carbonate, barium fluoride and sodium fluoride can be considered to be substantially neutral.

Barium carbonate, when added to an aqueous suspension of barium fluosilicate, reacts to form barium fluoride as has been experimentally proven; the decomposition of the barium fluosilicate and hydrolysis of the $SiF_4$ continue after decomposition of the barium carbonate until sufficient $BaF_2$ is formed, which then acts as if it had been added directly; a suspension of barium fluosilicate and barium carbonate acts then in a manner quite similar to a suspension of $BaSiF_6$ and $BaF_2$. The pH values of such suspensions were found as follows:

| | | |
|---|---|---|
| $BaSiF_6$<br>$BaCO_3$ | 95%<br>5% | 4.0–4.2 |
| $BaSiF_6$<br>$BaCO_3$ | 90%<br>10% | 4.2–4.4 |
| $BaSiF_6$<br>$BaCO_3$ | 80%<br>20% | 4.6–4.8 |

Such suspensions actually contain in their aqueous phase barium fluosilicate and barium fluoride.

Aqueous suspensions prepared according to the proportions indicated in the above tests have been tried in commercial spray equipments and in all instances where the pH of the suspension was equal to or exceeded the value of 4.0 no noticeable corrosion took place.

I claim:

1. A non-corrosive insecticidal mixture comprising barium fluosilicate as the active parasiticidal ingredient and a substantially neutral fluoride of a water solubility greater than that of calcium fluoride, said mixture having the property of imparting to its aqueous suspensions a pH of 4.0 and greater.

2. A non-corrosive insecticidal mixture comprising barium fluosilicate as the active parasiticidal ingredient and barium fluoride, said mixture having the property of imparting to its aqueous suspensions a pH of 4.0 and greater.

3. A non-corrosive insecticidal mixture comprising barium fluosilicate and aluminum-sodium fluoride, said mixture having the property of imparting to its aqueous suspensions a pH of 4.0 and greater.

4. A non-corrosive insecticidal mixture comprising barium fluosilicate and barium carbonate, said mixture when suspended in water producing an aqueous phase containing barium fluoride, said aqueous phase having a pH of 4.0 and greater.

5. A non-corrosive agricultural spray comprising an aqueous suspension of barium fluosilicate and a substantially neutral fluoride of a water solubility greater than that of calcium fluoride, said spray having a pH of 4.0 and greater.

6. A non-corrosive agricultural spray comprising an aqueous suspension of barium fluosilicate and barium fluoride, said spray having a pH of 4.0 and greater.

7. A non-corrosive agricultural spray comprising an aqueous suspension of barium fluosilicate and aluminum sodium fluoride, said spray having a pH of 4.0 and greater.

8. A non-corrosive agricultural spray comprising an aqueous suspension of barium fluosilicate and barium carbonate, said spray containing in its aqueous phase barium fluoride and having a pH of 4.0 and greater.

EARL B. ALVORD.